United States Patent [19]

Kim

[11] Patent Number: 4,949,202

[45] Date of Patent: Aug. 14, 1990

[54] DISK TRACK FOR LOCATING ZERO TRACK AND GENERATING TIMING FOR INDEX SIGNAL

[75] Inventor: Timothy Kim, San Jose, Calif.

[73] Assignee: Kalok Corporation, Sunnyvale, Calif.

[21] Appl. No.: 176,903

[22] Filed: Apr. 4, 1988

[51] Int. Cl.[5] ................................................ G11B 5/55
[52] U.S. Cl. .............................. 360/78.14; 360/78.04; 360/75
[58] Field of Search ................... 360/75, 78.04, 78.14; 377/44; 328/133

[56] References Cited

U.S. PATENT DOCUMENTS

| | | | |
|---|---|---|---|
| 4,495,533 | 1/1985 | Chambers | 360/75 X |
| 4,631,606 | 12/1986 | Sugaya | 360/78.14 X |
| 4,683,504 | 7/1987 | Cantello et al. | 360/78.14 |
| 4,685,007 | 8/1987 | Nazarian et al. | 360/78.14 |
| 4,736,341 | 4/1988 | Redmond et al. | 360/75 X |
| 4,823,212 | 4/1989 | Knowles et al. | 360/78.14 X |

FOREIGN PATENT DOCUMENTS 60-7664  1/1985  Japan .

*Primary Examiner*—Alan Faber
*Assistant Examiner*—David L. Robertson
*Attorney, Agent, or Firm*—Skjerven, Morrill MacPherson, Franklin & Friel

[57] ABSTRACT

A disk drive includes a disk (100) having a plurality of tracks (−2 TO N). The outermost track (−2) includes a first portion (102a) having a data pattern recorded therein that is unique to that track. The data in the first portion is used to determine the location of the outermost track. The outermost track also includes a second portion (102b) including data which is used to indicate the location of a selected sector within each track.

8 Claims, 4 Drawing Sheets

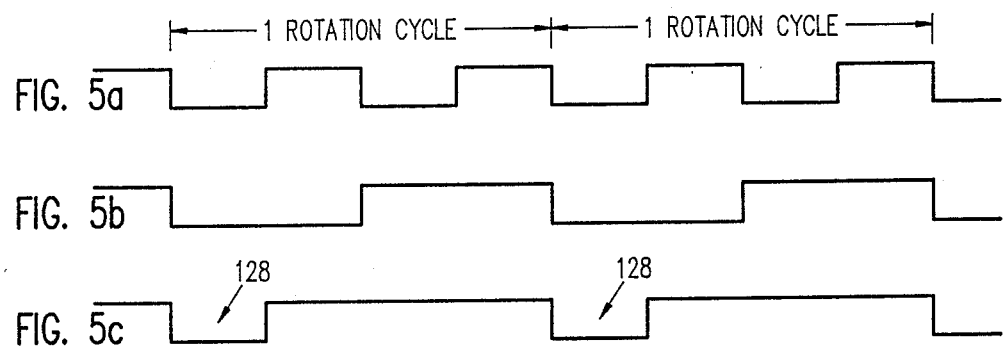
FIG. 5a
FIG. 5b
FIG. 5c
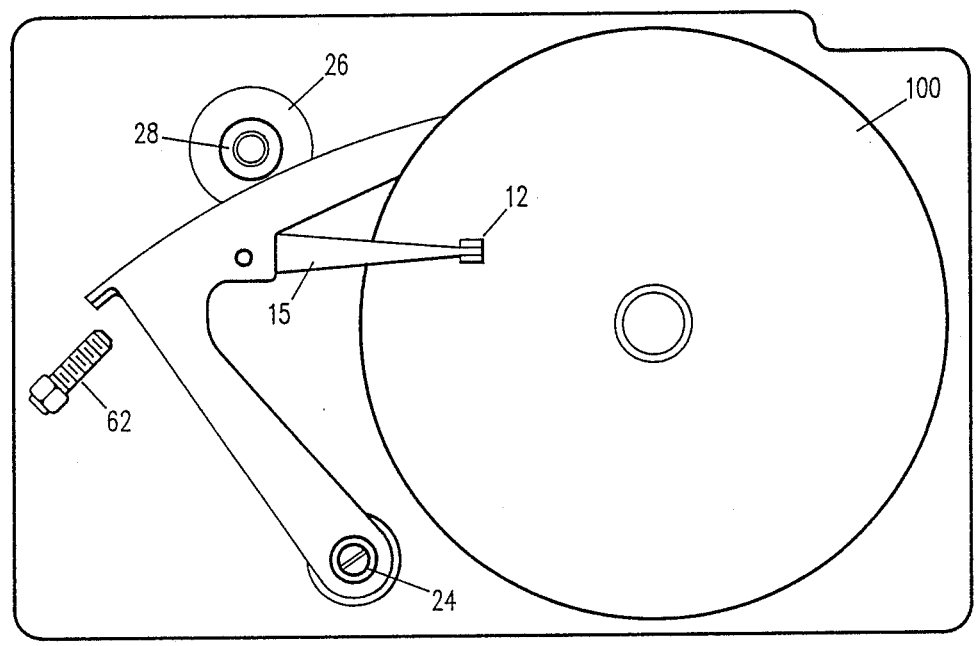
FIG. 6

DISK TRACK FOR LOCATING ZERO TRACK AND GENERATING TIMING FOR INDEX SIGNAL

BACKGROUND OF THE INVENTION

1. Field of the Invention

This invention relates to magnetic disks having a plurality of tracks and means for locating individual tracks.

2. Description of Prior Art

A typical magnetic disk drive includes a magnetic disk comprising a disk-shaped, nonmagnetic substrate and a film of magnetic media formed on each surface of the substrate. An example of such a disk is disk 10 illustrated in FIGS. 1a and 1b. Data is recorded on and read off of the media on the top surface of disk 10 by a read/write head 12. Disk 10 is connected to a rotor shaft 13 of a spindle motor 14 (FIG. 1b) which rotates disk 10 relative to read/write head 12. Motor 14 is typically either a 2-phase motor or a 3-phase motor. A typical 3-phase motor is illustrated in FIG. 2, and includes 4 magnets 70a to 70d mounted on a rotor housing 72 (which is rigidly affixed to rotor shaft 13), 9 coils 74a to 74i, and three hall sensors 76a to 76c. Rotor housing 72 and magnets 70a to 70d rotate relative to coils 74a to 74i and hall sensors 76a to 76c. The north pole of magnets 70a and 70c face coils 74a to 74i, while the south pole of magnets 70b and 70d face coils 74a to 74i. Each rotation cycle, the north pole of magnets 70a and 70c and the south pole of magnets 70b and 70d pass over each of hall sensors 76a to 76c. The hall sensors are used to determine when motor coils 74a to 74i should be driven with current. Disk drives employing a 2-phase motor operate in a similar manner.

As disk 10 rotates, read/write head 12 hovers over the portion of magnetic disk 10 passing underneath read/write head 12. Read/write head 12 senses changes in the magnetic field caused by the data recorded in the magnetic disk to thereby read the data. In addition, read/write 12 head can generate a magnetic field to record new data in magnetic disk 10. (As can be seen in FIG. 1b, a second magnetic disk 16 is also typically mounted on rotor shaft 13. Additional read/write heads 18, 20 and 22 are provided to read data from and write data to media on the bottom surface of disk 10, the top surface of disk 16, and the bottom surface of disk 16, respectively.)

Data is typically recorded in a series of tracks or concentric circular regions, e.g., tracks 0 to N on the media surface. A typical 3½ inch diameter disk can have as many as 600 to 800 tracks, each track comprising either 17, 18 or 32 sectors, depending on the software executed by the host CPU coupled to the disk drive.

Read/write head 12 is mounted on an arm 15 which is rotatably mounted on a support 24. Arm 15 is also mechanically coupled to a capstan 28 of stepper motor 26. As capstan 28 rotates, arm 15 (and therefore head 12) is moved either towards or away from the center of magnetic disk 10, i e., either in the direction of arrow C or arrow B. In this way, read/write head 12 can be positioned to read data from or write data to any of the tracks on magnetic disk 10.

When the magnetic disk drive is first turned on, it is necessary to ascertain the position of read/write head 12 relative to the various tracks of the magnetic disk. This is typically done in one of a number of ways. For example, one technique is to have stepper motor 26 pull arm 15 in direction B until elbow 30 of arm 15 hits a mechanical stop (not shown). The track underneath read/write head 12 when arm 15 impacts the stop is defined as track 0 and all other tracks are positioned relative to track 0. Unfortunately, the parts of the disk drive which mechanically impact each other tend to wear out and become unreliable. Further contamination particles are generated due to wear. Also, the impacting parts cause undesired noise.

Another technique for determining the location of track 0 is to employ an optical sensor (not shown). Thus, to find track 0, arm 15 is moved in the direction of arrow B until arm 15 blocks light from reaching the optical sensor. Unfortunately, this technique is unreliable. For example, if dust or dirt is present on the optical sensor, it will not be able to detect the position of arm 15.

Another technique for locating track 0 is to provide a track −2 which contains a unique, high frequency data pattern. During reset mode, read/write head 12 is moved in direction B until read/write head 12 senses the unique data pattern. Once that unique data pattern is found, the head moves in direction C two steps to thereby be positioned over track 0.

It is also necessary to determine the location of the beginning of each track, i.e., the location of the first sector of data on each track. In one prior art device, an additional magnet 32 is mounted on rotor shaft 13 or rotor housing 72 of motor 14 (FIG. 1b). An additional hall sensor 34 is affixed to the disk drive housing near the path traced by magnet 32 as motor 14 causes magnet 32 to rotate. At the point in time when magnet 32 passes next to hall sensor 34, hall sensor 34 generates an electrical signal which determines where the first sector of each track is.

It would be desirable to eliminate magnet 32 and hall sensor 34 to thereby minimize the number of components required to manufacture the disk drive. Although, as mentioned above, spindle motor 14 includes three other hall sensors which provide pulses indicating when the spindle motor is in a certain position, the three other hall sensors provide positive output pulses twice per revolution and negative pulses twice per revolution (because of the magnetic fields provided by magnets 70a to 70d), and could not be used to differentiate whether the disk was in a first position or a second position 180° out of phase with the first position.

SUMMARY OF THE INVENTION

A magnetic disk drive constructed in accordance with our invention is used in conjunction with a magnetic disk having a number of tracks. The outermost track (typically track −2) includes a unique data pattern including a first portion which provides a high frequency output signal, and a second portion which provides a low frequency output signal. Of importance, the frequency provided by the high frequency portion of track −2 is greater than the frequency of the signal typically provided by the remainder of the magnetic disk. The read/write head of the disk drive is connected to a circuit which senses the presence of the high frequency signal, and thus determines when the read/write head is located over track −2.

The circuit coupled to the read/write head also senses when the disk read/write head is located over the low frequency portion of track −2. When the read/write head is located over the low frequency portion of track −2, the circuit emits a signal which is used to determine where the first sector of each track is located.

These and other advantages of the present invention are better understood with reference to the detailed description below.

BRIEF DESCRIPTION OF THE DRAWING

FIGS. 5a to 5c illustrate waveforms provided by the circuit of FIG. 4.

FIG. 6 illustrates in plan view a disk drive in accordance with my invention.

DETAILED DESCRIPTION

Figure 1A:
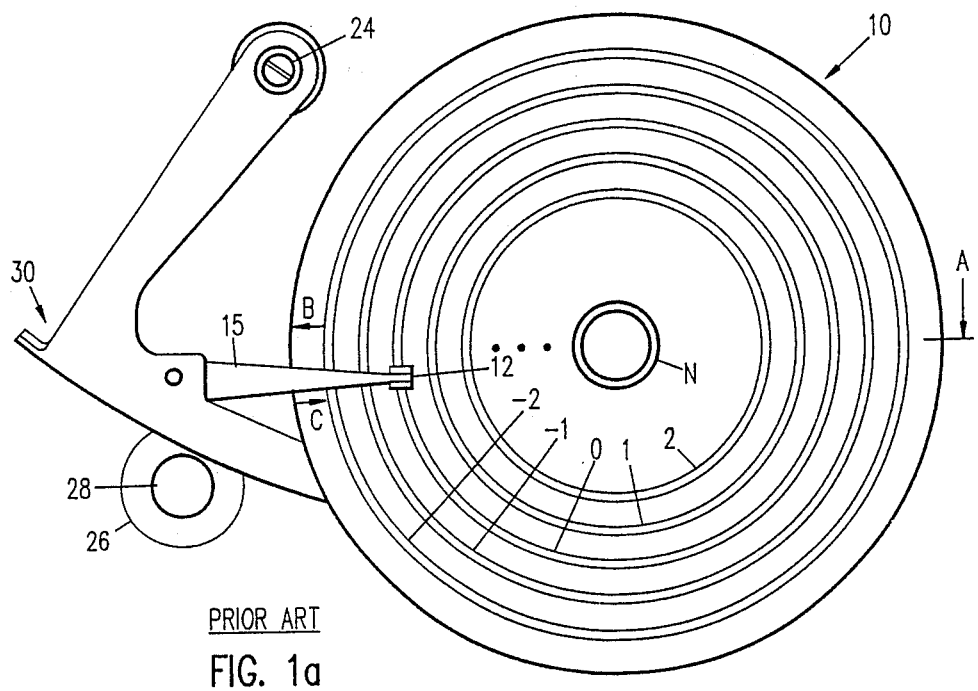
FIGS. 1a and 1b illustrate a magnetic disk drive constructed in accordance with the prior art.
Figure 1B:
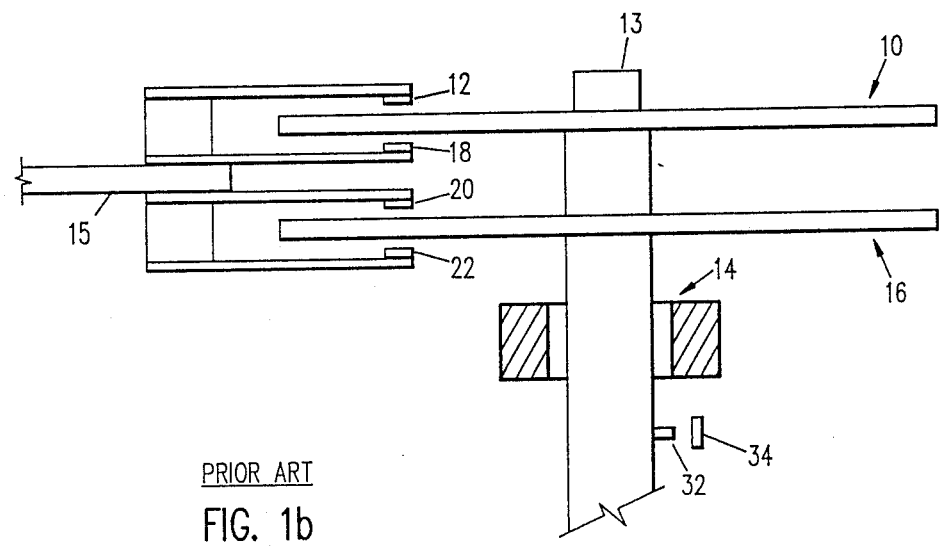
Figure 3:
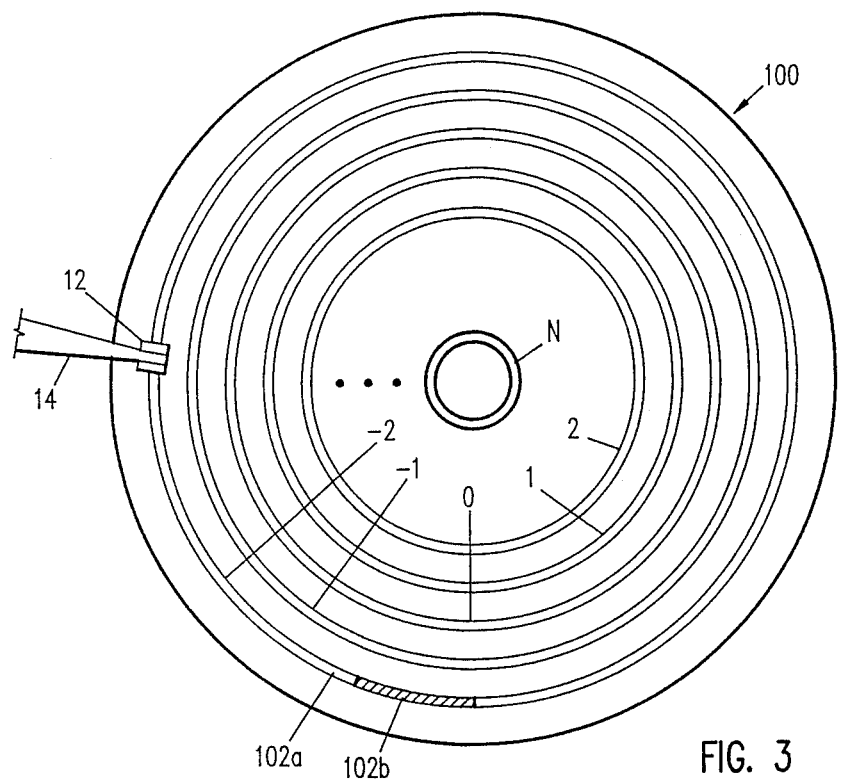
FIG. 3 illustrates in plan view a magnetic disk constructed in accordance with my invention.

The mechanical components of a disk drive constructed in accordance with my invention are similar to those illustrated in FIGS. 1a and 1b. However, instead of merely containing a high frequency signal, track −2 of magnetic disk 100 (FIG. 3) includes a portion 102a magnetically encoded to provide a pulse stream having a frequency of 3.5 MHz or higher and a portion 102b which provides a signal having a frequency of 3 MHz or lower. During use, disk 100 rotates with a rotation period of 16.6 ms. Read/write head 12 extends over portion 102a of track −2 during 15.67 ms of the rotation period, and thus read/write head 12 receives a signal from portion 102a having a frequency greater than or equal to 3.5 MHz, whereas during 1 ms of each rotation period, read/write head 12 extends over portion 102b and thus receives a signal having a frequency of 3 MHz or lower.

Read/write head 12 is connected to a pulse generator circuit 104 (FIG. 4) which provides a pulse on the rising edge and the falling edge of the signal provided by read/write head 12. Thus, circuit 104 functions as a frequency doubler, and when read/write head 12 is over portion 102a, pulse generator 104 provides an output signal of 7 MHz or higher, whereas when read/write head 12 is over portion 102b, pulse generator 104 provides an output signal having a frequency of 6 MHz or lower. The output signal from circuit 104 is coupled to a detector circuit 106 which provides a binary low signal on an output lead 108 when the signal provided by circuit 104 is greater than 6.5 MHz and provides a binary high signal on output lead 108 when the output signal from circuit 104 is less than 6.5 MHz. Of importance, the only portion of disk 100 which causes the output signal from pulse generator 104 to be 6.5 MHz or higher is portion 102a of track −2. Thus, the output signal from detector circuit 106 only goes low when read/write head 12 is over portion 102a of track −2. In this way, when the output signal from detector circuit 106 is low, read/write head 12 is known to be over track −2.

As is known in the art, noise or disk defects may briefly cause the output signal from detector circuit 106 to go low when read/write head 12 is not over track −2. Accordingly, in one embodiment, during each rotation period, the output signal from circuit 106 is sampled 5 times for 1 ms during a rotation period, and only if the signal from circuit 106 is low during at least 4 of those times is the detector output signal interpreted as indicating that head 12 is over track −2.

When the magnetic disk drive is being reset, it is necessary to locate track 0, and thus arm 15 is pulled in direction B by stepper motor 26 until the output signal from detector circuit 106 goes low. When the signal from detector circuit 106 goes low, it is known that the read/write head 12 is over track −2. Subsequently, read/write head 12 is moved inward (in direction C) by stepper motor 26 by two steps to track 0 or by another number of steps, as appropriate, to read from or write to any other desired track.

Stepper motor 26 is controlled by a microprocessor 101 which is coupled to output lead 108. Microprocessor 101 also controls the transfer of data between a host device (such as a host CPU) and the disk drive, as well as a number of other functions. In the one embodiment, microprocessor 101 is device model number 8049, manufactured by Intel Corporation.

Figure 4:
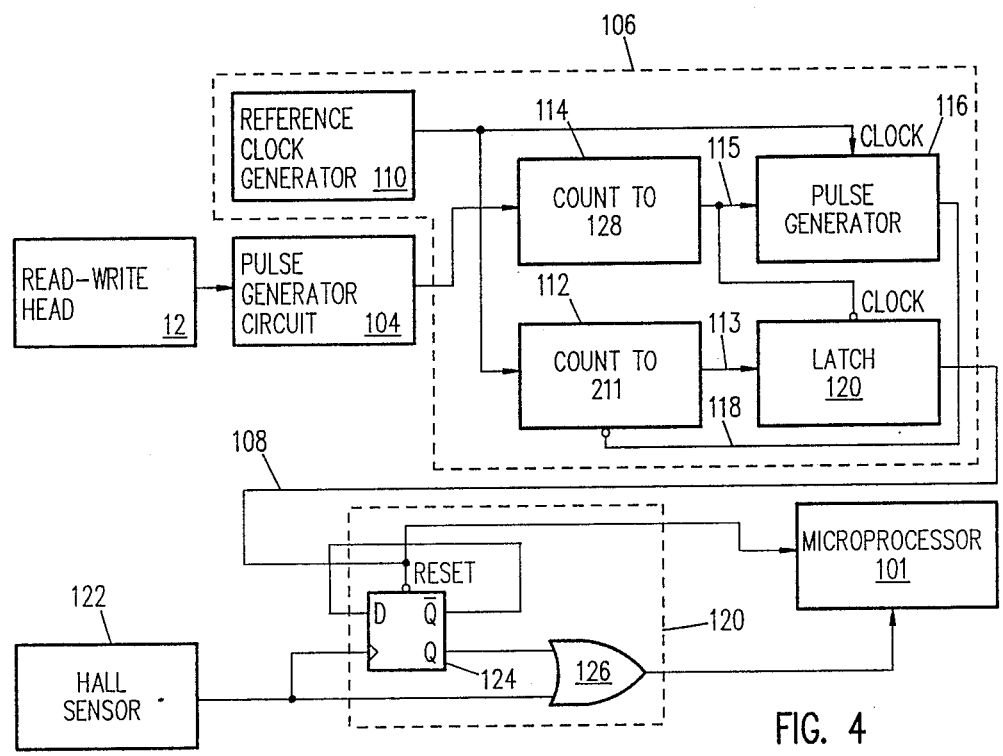
FIG. 4 is a block diagram of a circuit coupled to a read/write head in accordance with my invention.

FIG. 4 illustrates the various components of detector circuit 106, which includes a reference clock generator 110. Clock generator 110 provides a clock signal having a frequency of about 9.8304 MHz to a count to 211 circuit 112. The output signal from pulse generator 104 is coupled to a count to 128 circuit 114, which in turn is coupled to a pulse generator 116. Count to 128 circuit 114 is a counter which counts to 128, resets itself, and resumes counting. The signal on output lead 115 of circuit 114 is the most significant bit of counter 114, which is initially low, goes high after circuit 114 receives 64 pulses, and then goes low after counter 114 receives another 64 pulses. Similarly, count to 211 circuit 112 is a counter which counts to 122, is reset, and resumes counting. Output lead 113 of circuit 112 is the most significant bit of the counter, which is initially low, then goes high after circuit 112 receives 211 pulses, and remains high until circuit 112 is reset. However, as discussed below, circuit 112 is sometimes reset prior to counting to 211 by a signal on a reset line 118.

Pulse generator 116 receives a square wave output signal from count to 128 circuit 114 and generates therefrom a train of negative pulses having the same frequency as the output signal from circuit 114, but a much higher duty cycle. The output signal from pulse generator 116 is connected to reset input lead 118 of count to 211 circuit 112. Of importance, if the signal provided by read/write head 12 has a very high frequency, e.g., greater than 3.25 MHz, pulse generator 116 will reset count to 211 circuit 112 before the output signal from circuit 112 can go high. Thus, every time the output signal from circuit 114 goes low (which causes a latch 120 to store the output signal from circuit 211), the output signal from count to 211 circuit 112 will be low, and the output signal provided on output lead 108 by latch 120 will be low. However if the output signal from read/write head 12 is less than 3.25 MHz, the output signal from count to 211 circuit 112 will go high before the output signal from count to 128 circuit 114 goes low, and thus latch 120 will store a high signal. In this way, detector circuit 106 provides an output signal on lead 108 which indicates whether the frequency from read/write head 12 is greater or less than 3.25 MHz.

As mentioned above, track −2 also includes portion 102b which provides a low frequency signal. Thus, when read/write head 12 is over portion 102b, the output signal from detector circuit 106 goes low. The point in time when the detector circuit output signal goes low is used to locate the zero sector in a manner described below.

Figure 2:
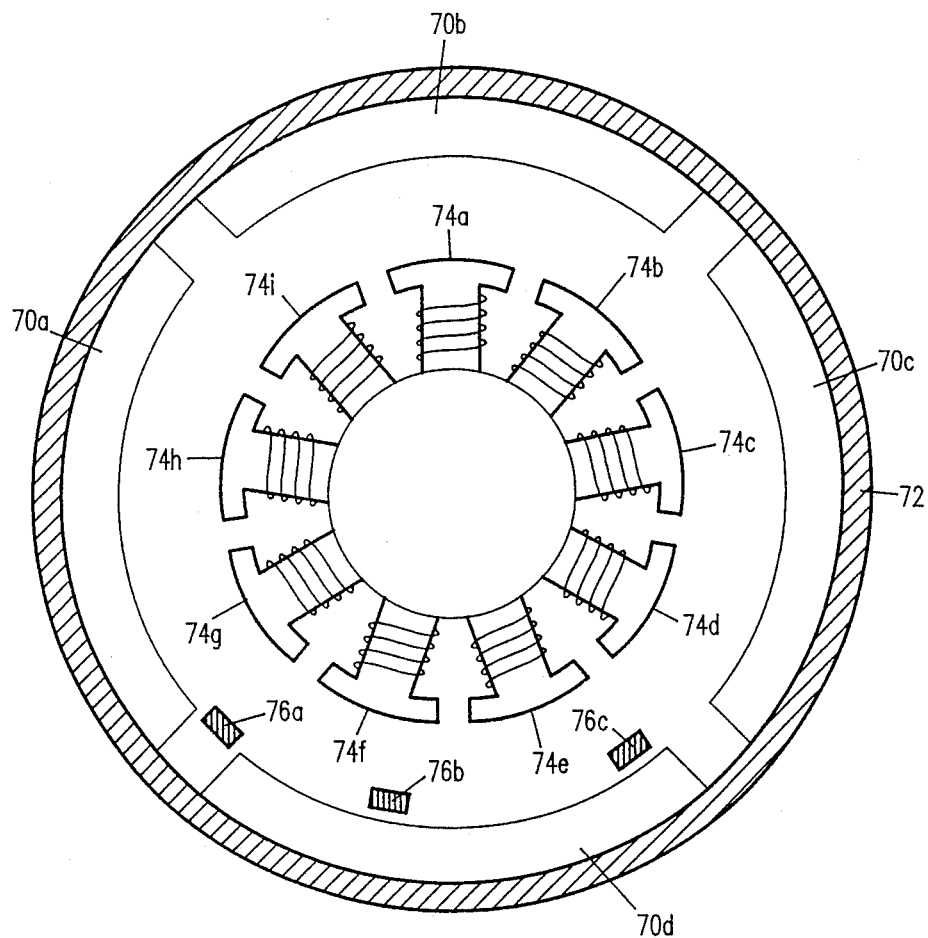
FIG. 2 illustrates a prior art 3-phase motor used to rotate disk 10 of FIGS. 1a and 1b.

Spindle motor 16 used to rotate magnetic disk 10 is either a 2-phase a motor or a 3-phase motor. In one embodiment, spindle motor 14 is a 3-phase motor such as the motor illustrated in FIG. 2. A set of three hall sensors are affixed to the disk drive housing. As the magnets within spindle motor 14 rotate, they come within proximity to and are sensed by the hall elements. As mentioned above, the position of the magnets relative to the hall sensors are used to determine when a set of coils within the motor should be driven with current. Every cycle, the north poles of two of the magnets are in proximity to each of the hall sensors once, and the south poles of two of the magnets are in proximity to the hall sensors once (see FIG. 2). Thus, every cycle, each hall sensor provides two positive pulses, e.g., to above-mentioned control microprocessor 101. FIG. 5a illustrates a wave form provided by one of the hall sensors. If one were to attempt to use the pulses from one of the hall sensors to determine the location of the zero sector, it would be impossible to determine whether any edge of the wave form of FIG. 5a indicated that the motor was in a first position or a second position 180° out of phase with the first position. However, in accordance with one novel feature of my invention, immediately after sensing that read/write head 12 is over portion 102b of track −2, a circuit 120, which is coupled to a hall sensor 122 (one of the three hall sensors within three phase motor 14) and which is also coupled to lead 108 searches for the next output pulse from sensor 122. This output pulse from sensor 122 immediately following the time portion 102b passes under read/write head 12 is used to determine the location of the zero sector of the other tracks of disk 100. Thus, every second occurrence of the output pulse from hall sensor 122 thereafter is used as an index pulse and marks the location of the zero sector for the various tracks of the magnetic disk during reading and writing operations. In this way, it is not necessary to provide an extra magnet and hall sensor to mark the location of the zero sector on each track.

Referring to FIG. 4 circuit 120 includes a D type flip-flop 124 having a clock input lead coupled to hall sensor 122 and a data input lead coupled to the $\bar{Q}$ output lead of flip-flop 124. (As mentioned above, hall sensor 122 is one of the hall sensors of the 3-phase motor.) The $\bar{Q}$ output head at flip-flop 124 provides the output waveform of FIG. 5b, which is a square wave having a frequency equal to half the frequency of the waveform of FIG. 5a.

The output signal on lead 108 is used to reset flip-flop 124. Thus, flip-flop 124 is reset when read/write head 12 is over portion 102b of track −2. The logical sum of the signal from hall sensor 122 and the Q output signal of flip-flop 124 is provided by an OR gate 126, the output signal at which is illustrated in FIG. 5c. Of importance, circuit 120 produces a negative pulse 128 once per revolution which serves as the disk drive index pulse.

The spindle motor used to rotate disk 100 can be device model number 455742GA01, manufactured by Nidec Corporation of Japan. This motor comes with the above-mentioned three hall sensors and four magnets.

In one embodiment, stepper motor 26 is designed such that the positions motor 26 steps through are divided into groups of 8 steps or phases. (An example of such a stepper motor is device model number 73005-001, manufactured by Sanyo Denki Corporation of Japan.) Track −2 is formed in disk 100 when motor 26 is in a predetermined phase known as phase A. Then, when searching for track −2, motor 26 is positioned to be in phase A and is stepped in direction C eight tracks at a time. Thus, track −2 can be located by sequentially placing head 12 over every eighth track instead of every single track.

During manufacturing, track −2 can be recorded in disk 100 by first causing stepper motor 26 to push read/write head 12 in direction C until read/write head 12 impacts an inner crash stop (not shown). This is typically accomplished by causing stepper 26 to motor push arm 14 an arbitrarily large number of steps, e.g. 800 steps. Stepper motor 26 then pulls head 12 in direction B 672 steps. At that time, head 12 extends over track −8 (track −8 is not used to record data, and is thus not illustrated in FIG. 3.) An outer crash stop screw 62 (FIG. 6) is then set so that read/write head 12 cannot inadvertently be pulled past track −6. Stepper motor 26 then pushes read/write head 12 in 6 steps so that it is positioned over to-be-formed track −2. Portions 102a and 102b are then recorded, thereby forming track −2.

As mentioned above, track −2 is recorded during the manufacturing process. In one embodiment, the portion of disk 100 between track −6 and track −2 is erased so that read/write head 12 will not pick up extraneous noise signals from the media adjacent track −2. Similarly, track −1 is also erased. In the one embodiment, the portions of the media one-half of a step inside and outside track −2 are also erased during manufacturing.

The disk is typically formatted by the user. During formatting, the various sectors on each track are set up, i.e. sync data is written to mark the beginning of each sector, and label information is provided, e.g. identifying the number of bytes of data in the sector. In addition, other information is recorded at the beginning of each sector as required by the host CPU software. The format for the sync pulses and ID fields in each sector depend upon the host CPU software. The structure of such ID fields and sync pulses are well known in the art. (See, for example, the book entitled "Advance Peripheral Processing Solutions—Mass Storage", published by National Semiconductor Corporation in 1986, incorporated herein by reference.) The first sector on each track is recorded immediately following the hall sensor output pulse from motor 14 that is used as an index pulse as described above during formatting. Some host CPU systems use both the index pulse and the sector ID fields to locate desired sectors during read and write operations. Other host CPU systems rely solely on the sector ID fields to locate sectors during reading and writing. A disk drive in accordance with my invention can accommodate both types of CPU systems.

While the invention has been described with regard to a specific embodiment, those skilled in the art will recognize that changes can be made in form and detail without departing from the spirit and the scope of the invention. For example, arm 15 can be of the type described in U.S. patent application Ser. No. 07/170,823 entitled "Low Inertia, Single Component Arm Actuator" filed by S. Kaczeus and G. Kudo on the same day as the present Application, incorporated herein by reference. Accordingly, all such changes come within the present invention.

I claim:

1. A data storage device comprising a magnetic disk including a plurality of tracks, at least one of said tracks having only a first portion and a second portion: wherein
  said first portion contains data unique to said track so that when a read/write head is positioned over said first portion, said read/write head receives a signal unique to said track; and
  said second portion contains data so that when a read/write head is positioned over said second portion, said read/write head receives a second signal, said second signal being an index signal.

2. A data storage device comprising:
  a magnetic disk including a plurality of tracks, at least one of said tracks having a first portion and a second portion wherein said first portion contains data unique to said track so that when a read/write head is positioned over said first portion, said read/write head receives a signal unique to said track, and said second portion contains data so that when a read/write head is positioned over said second portion, said read/write head receives an index signal used to determine the location of a sector within each of said tracks within the remainder of said plurality of tracks; and
  a motor having a rotor coupled to said disk for causing said disk to rotate, said motor further comprising:
    magnet means coupled to said rotor, said rotor also causing said magnet means to rotate, said magnet means generating a magnetic field; and
    sensing means for sensing a magnetic field and for generating a sense signal in response thereto, said sensing means being mounted in proximity to the path traced by said magnet means as said magnet means rotates such that said sensing means provides a plurality of sense signals per revolution of said magnet means, the location of a sector within said tracks being determined by determining which one of said plurality of sense signals immediately follows the passage of said second portion past a predetermined point as said disk rotates.

3. The data storage device of claim 2 further comprising:
  means for moving said read/write head towards and away from the center of said disk so that said read/write head can read data from and write data to any of said tracks within said remainder; and
  means for causing said read/write head to format said disk, whereby sector identification data is written into portions of said track within said remainder, the position of said sector identification data being determined in response to said one sense signal.

4. The data storage device of claim 3 further including means for causing said read/write head to read data from and write data to said tracks within said remainder, said one signal being used to determine which sector on said tracks within said remainder is the first sector of said tracks.

5. A data storage device comprising:
  a magnetic disk having at least one surface, said surface having at least one track, said one track having only first and second portions;
  a read/write head;
  means for causing said read/write head to read data from and write data to said surface, the data stored in said one track being unique compared to data stored in the other tracks, if any, which are recorded in said surface;
  means for locating the other tracks recorded in said surface, if any, by moving said read/write head until said read/write head is in a position such that write head receives said unique data and then moving said read/write head a predetermined distance from said position; and
  means for providing an index signal when said disk is in a predetermined rotational position, said rotational position being determined in response to the location of said second portion within said one track.

6. A method comprising the steps of:
  causing a magnetic disk to rotate, said magnetic disk including at least one track consisting of a first portion having a unique data pattern stored therein and a second portion;
  searching for a track position by moving said read/write head relative to said disk until said read/write head senses said unique data pattern and then moving said read/write head a predetermined distance to a desired track location; and
  providing an index pulse signal indicative of the rotational position of said disk, said index pulse signal being provided at a time dependent on the position of said second portion in said one track.

7. A method comprising the steps of;
  causing a magnetic disk to rotate, said magnetic disk including at least one track having a unique data pattern stored therein, said track comprising first and second portions;
  searching for a track position by moving said read/write head relative to said disk until said read/write head senses said unique data pattern and then moving said read/write head a predetermined distance to a desired track location; and
  providing an index pulse signal indicative of the rotational position of said disk, said index pulse signal being provided at a time dependent on the position of said second portion in said one track
  wherein said magnetic disk is caused to rotate by a motor, said motor comprising magnet means for generating a magnetic field, said motor also causing said magnet means to rotate, said motor comprising sense means mounted at a location in proximity to the path traced by said magnet means for providing signals responsive to the magnetic field at said location, said sense means providing a plurality of said signals per revolution of said disk, said method comprising the step of selecting one of said signals within said plurality in response to the timing of said one signal relative to the time said read/write head is over said second portion.

8. A circuit for determining when a read/write head is over a disk track having a unique high frequency data signal recorded therein comprising:
  means for providing a reference clock signal;
  means for providing a pulse train having a frequency determined by the frequency of a signal received by said read/write head;
  a first counter incrementing in response to said reference clock signal, said first counter providing an output signal in response to the contents of said first counter;
  a second counter incrementing in response to said pulse train, said second counter providing an output signal in response to the contents of said second counter; and
  means for resetting said first counter in response to said output signal from said second counter, the output signal from said first counter indicating when said read/write head receives a signal above a predetermined frequency.

* * * * *

UNITED STATES PATENT AND TRADEMARK OFFICE
CERTIFICATE OF CORRECTION

PATENT NO.    :   4,949,202
DATED         :   August 14, 1990
INVENTOR(S)   :   Timothy Kim It is certified that error appears in the above-identified patent and that said Letters Patent is hereby corrected as shown below:

Column 6, line 60, serial number "07/170,823" should read --07/176,823--.

Signed and Sealed this

Twenty-first Day of July, 1992

*Attest:*

DOUGLAS B. COMER

*Attesting Officer*     *Acting Commissioner of Patents and Trademarks*